US00RE42248E

(19) United States
(12) Reissued Patent
Hosoda et al.

(10) Patent Number: US RE42,248 E
(45) Date of Reissued Patent: Mar. 29, 2011

(54) CLEANING METHOD, CLEANING APPARATUS AND ELECTRO OPTICAL DEVICE

(75) Inventors: Toshiko Hosoda, Chino (JP); Shinichi Yotsuya, Chino (JP)

(73) Assignee: Seiko Epson Corporation (JP)

(21) Appl. No.: 12/411,838

(22) Filed: Mar. 26, 2009

Related U.S. Patent Documents

Reissue of:
(64) Patent No.: 7,459,029
Issued: Dec. 2, 2008
Appl. No.: 11/001,498
Filed: Dec. 1, 2004

(30) Foreign Application Priority Data

Dec. 2, 2003 (JP) ..... 2003-403071

(51) Int. Cl.
*B08B 3/04* (2006.01)

(52) U.S. Cl. ..... 134/26; 134/1; 134/2; 134/22.1; 134/22.14; 134/22.19; 134/34; 134/36; 134/42; 134/902; 510/175; 438/745

(58) Field of Classification Search ..... 510/175; 134/1–2, 22.1, 22.14, 22.19, 26, 34, 36, 42, 134/902; 438/745
See application file for complete search history.

(56) References Cited

U.S. PATENT DOCUMENTS

| | | | | | |
|---|---|---|---|---|---|
| 3,764,384 | A | * | 10/1973 | Berni et al. | 134/12 |
| 4,906,303 | A | * | 3/1990 | Freij | 134/38 |
| 5,399,203 | A | * | 3/1995 | Ishikawa et al. | 134/10 |
| 5,502,978 | A | * | 4/1996 | Field | 62/157 |
| 5,698,045 | A | * | 12/1997 | Walsh et al. | 134/12 |
| 6,068,000 | A | * | 5/2000 | Tanabe et al. | 134/1.3 |
| 6,198,518 | B1 | * | 3/2001 | Kuga | 349/71 |
| 6,476,988 | B1 | * | 11/2002 | Yudasaka | 359/885 |
| 6,617,265 | B2 | * | 9/2003 | Tanaka et al. | 430/5 |

(Continued)

FOREIGN PATENT DOCUMENTS

| | | | |
|---|---|---|---|
| JP | 07-109494 | * | 4/1995 |
| JP | 08-244040 | * | 9/1996 |
| JP | 08-319586 | * | 12/1996 |
| JP | 2000-282219 | * | 10/2000 |
| KR | 2002-0033041 | * | 5/2002 |
| KR | 2003-0030933 | * | 4/2003 |
| WO | WO99-61573 | * | 12/1999 |
| WO | WO03/057642 | * | 7/2003 |

OTHER PUBLICATIONS

Communication from Chinese Patent Office (with translation) regarding counterpart application.*

Communication from Taiwan Patent Office regarding corresponding application; no date noted.*

Communication from Chinese Patent Office (with translation) regarding counterpart application; no date noted.*

Communication from Korean Patent Office regarding corresponding application; no date noted.*

*Primary Examiner*—Sharidan Carrillo
(74) *Attorney, Agent, or Firm*—Harness, Dickey & Pierce, P.L.C.

(57) ABSTRACT

A cleaning apparatus of organic substances attached to a vapor-deposition mask for low molecular weight organic EL devices comprises a first stage for treating a vapor-deposition mask with a derivative of pyrrolidone, a second stage for rinsing the vapor-deposition mask with water, and a third stage for rinsing the vapor-deposition mask with flowing water. The cleaning apparatus also comprises a fourth stage for treating the vapor-deposition mask with ethanol, a fifth stage for drying the vapor-deposition mask, and a carrying means that carries the vapor-deposition mask to each stage in sequence. It is desirable to adopt N-methyl-2-pyrrolidone as the derivative of pyrrolidone.

15 Claims, 5 Drawing Sheets

U.S. PATENT DOCUMENTS 6,805,135 B1 * 10/2004 Hirota et al. ..... 134/2
6,841,008 B1 * 1/2005 Branco et al. ..... 134/26
6,878,213 B1 * 4/2005 Rosato et al. ..... 134/3
6,988,922 B2 * 1/2006 Iwaki ..... 445/6
7,073,518 B2 * 7/2006 Ishikawa et al. ..... 134/1.1
2001/0001784 A1 * 5/2001 Leduc et al. ..... 510/175
2002/0066466 A1 * 6/2002 Tan ..... 134/3
2002/0107158 A1 * 8/2002 Peters et al. ..... 510/175
2003/0022099 A1 * 1/2003 Lin et al. ..... 430/270.1
2003/0116845 A1 * 6/2003 Bojkov et al. ..... 257/738
2003/0171239 A1 * 9/2003 Patel et al. ..... 510/406
2005/0115594 A1 * 6/2005 Hosoda et al. ..... 134/61

* cited by examiner

| PROCESS | TREATMENT | CONDITION |
|---|---|---|
| 1 | N-METHYL-2-YRROLIDONE | IMMERSION AT ROOM TEMPERATURE FOR THREE MINUTES |
| 2 | WATER RINSE 1 | IMMERSION AT ROOM TEMPERATURE FOR FIVE MINUTES |
| 3 | WATER RINSE 2 | IMMERSION IN FLOWING WATER FOR FIVE MINUTES |
| 4 | ETHANOL SUBSTITUTION | IMMERSION AT ROOM TEMPERATURE FOR FIVE MINUTES |
| 5 | AIR DRYING | TEN MINUTES |

FIG. 6

| CLEANING FLUID | RESULT | SAFETY OF CHEMICAL | NOTE |
|---|---|---|---|
| 2.38% AQUEOUS TMAH SOLUTION | × | | NMD-3 DEVELOPER |
| 25% AQUEOUS TMAH SOLUTION | × | | |
| 3% AQUEOUS KOH SOLUTION | × | | |
| MIXTURE OF DIMETHYLSULFOXIDE AND MONOETHANOLAMINE | △ | CHEMICAL RELATIVE TO PRTR | CLEANING EFFECT EXHIBITED BUT SLOW |
| N-METHYL-2-PYRROLIDONE | ◎ | | GOOD • NO DEPENDENCE ON ORGANIC MATERIAL |
| ETHANOL | × | REQUIRE EXPLOSION-PROOF FACILITY | |
| ACETONE | △ | REQUIRE EXPLOSION-PROOF FACILITY | CLEANABLE BUT REATTACHMENT CAUSED |
| I P A | △ | REQUIRE EXPLOSION-PROOF FACILITY | CLEANABLE BUT REATTACHMENT CAUSED |

CLEANING METHOD, CLEANING APPARATUS AND ELECTRO OPTICAL DEVICE

Matter enclosed in heavy brackets [ ] appears in the original patent but forms no part of this reissue specification; matter printed in italics indicates the additions made by reissue.

RELATED APPLICATIONS

This application claims priority to Japanese Patent Application No. 2003-403071 filed Dec. 2, 2003 which is hereby expressly incorporated by reference herein in its entirety.

BACKGROUND

1. Field of the Invention

The present invention relates to a cleaning method, a cleaning apparatus and an electro optical device.

2. Related Art

In a low molecular weight organic electro luminescence (EL) device, light emitting layers composed of low molecular weight organic materials are formed on a glass substrate. The light emitting layers composed of low molecular weight organic materials are formed by vapor-deposition. Vapor-deposition is a method in which a small piece of a material is heated and evaporated in a high vacuum so as to, be deposited on a substrate as a thin film. When light emitting layers are formed by vapor-deposition, a vapor-deposition mask needs to be disposed in order to prevent organic materials from attaching to regions other than the regions on which the light emitting layers are desired to be formed. In addition, protection plates need to be disposed in order to prevent organic materials from attaching to an inner wall and so forth of a vapor-deposition chamber.

Here, multiple vapor-deposition treatments results in a state in which organic substances are deposited on the surfaces of a protection plate, a vapor-deposition mask and so forth, which are manufacturing devices for organic EL devices. If a protection plate on which organic substances are deposited is permitted to repeatedly remain standing, the inside of a vapor-deposition chamber is contaminated. Also, the vapor-deposition mask that is formed of a metal thin plate or the like bends greatly because of the weight of the organic substances, thereby affecting the accuracy of patterning. Therefore, it is essential to remove the organic substances deposited on the protection plate, vapor-deposition mask and so forth periodically.

Thus, manual scrubbing away of organic substances deposited on a protection plate, a vapor-deposition mask and so forth is carried out by human hands. Also, in Japanese Unexamined Patent Publication No. 8-319586, a method in which a mixed gas plasma is generated in a treatment chamber after etching treatment so as to remove residual reaction products in the treatment chamber has been proposed. Furthermore, in Japanese Unexamined Patent Publication No. 2000-282219, a method in which organic films attached to a mask through organic-film vacuum deposition are removed by heat treatment without breaking a vacuum has been proposed.

The method of manual scrubbing (by human hands), however, suffers from a problem in that many workers are required. Thus, the establishment of a cleaning process that needs no human hands and is favorable in terms of working efficiency has been desired.

In both methods proposed in the above patent documents, organic films and so forth are removed in a treatment chamber (chamber), and therefore the modification of a vapor-deposition apparatus is required. Accordingly, there is a problem in that a large cost is required.

The present invention is devised in order to solve the above problems and is intended to provide a cleaning method and a cleaning apparatus that can easily remove organic substances attached to a manufacturing device for electro optical devices. Also, the present invention is intended to provide a high quality electro optical device.

SUMMARY

To this end, a cleaning method of the present invention comprises cleaning an organic substance attached to a manufacturing device of an electro optical device by using a derivative of pyrrolidone.

Derivatives of pyrrolidone utilized for resist removal and so forth are superior in decomposing organic substances.

Thus, organic substances can be removed without requiring physical treatment such as scrub-cleaning and the modification of a manufacturing device. Therefore, organic substances attached to a manufacturing device of an electro optical device can easily be removed.

Furthermore, a cleaning method of an organic substance attached to a manufacturing device of an electro optical device comprises: treating the manufacturing device with a derivative of pyrrolidone; treating the manufacturing device with water; and treating the manufacturing device with ethanol.

Organic substances attached to a manufacturing device are removed through treatment with derivatives of pyrrolidone. Also, the derivatives of pyrrolidone attached to the manufacturing device are removed through treatment with water. Furthermore, treatment with ethanol allows the water attached to the manufacturing device to be replaced by ethanol.

Then, the ethanol, which has a low boiling point, attached to the manufacturing device can be dried rapidly. Therefore, organic substances attached to a manufacturing device of an electro optical device can easily be removed.

The derivative of pyrrolidone is preferably N-methyl-2-pyrrolidone.

N-methyl-2-pyrrolidone is superior in the action of removing organic substances particularly. Therefore, organic substances attached to a manufacturing device of an electro optical device can easily be removed.

The manufacturing device of the electro optical device may be a protection plate used for vapor-deposition treatment of a functional layer of an organic EL device.

With this configuration, organic substances attached to the protection plate can be removed easily, and thus contamination in the vapor-deposition chamber can be prevented.

The manufacturing device of the electro optical device may be a mask used for vapor-deposition treatment of a functional layer of an organic EL device.

With this configuration, organic substances attached to the mask can be removed easily, and thus the bending of the mask due to the weight of the organic substances is avoided. Therefore, the accuracy of vapor-deposition treatment can be ensured.

The manufacturing device is preferably cleaned at room temperature.

With this configuration, the deformation of the manufacturing device as a result of heating can be avoided, and therefore an electro optical device can be manufactured with high accuracy.

The manufacturing device is preferably cleaned using ultrasonic waves.

With this configuration, organic substances attached to a manufacturing device of an electro optical device can be removed effectively.

A cleaning apparatus of the present invention is a cleaning apparatus of an organic substance attached to a manufacturing device of an electro optical device, and comprises: a stage for treating the manufacturing device with a derivative of pyrrolidone; a stage for treating the manufacturing device with water; a stage for treating the manufacturing device with ethanol; a stage for drying the manufacturing device; and carrying means that carries the manufacturing device to each stage in sequence.

With this configuration, organic substances attached to a manufacturing device of an electro optical device can be removed easily.

An electro optical device of the present embodiment is manufactured by cleaning a manufacturing device of the electro optical device by using the above described cleaning methods, and then using the manufacturing device of the electro optical device that has been cleaned.

With this configuration, the accuracy of vapor-deposition treatment can be ensured by removing organic substances attached to a manufacturing device of an electro optical device, and thus a high quality electro optical device can be provided.

BRIEF DESCRIPTION OF THE DRAWINGS

FIG. 6 shows results of cleaning by each cleaning fluid in a working example and the safety of each cleaning fluid.

DETAILED DESCRIPTION

Figure 1:
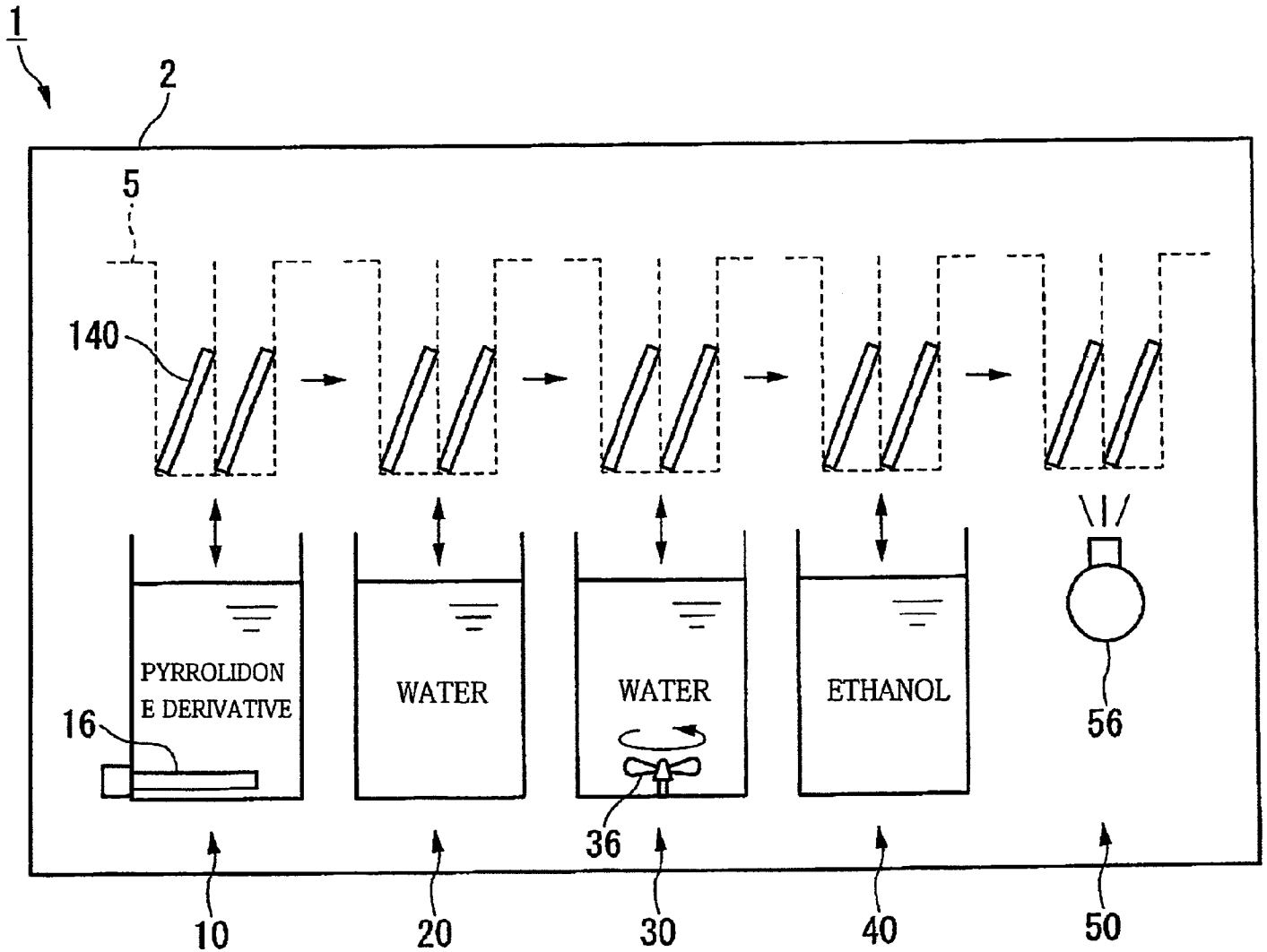
FIG. 1 is an explanatory diagram showing the schematic structure of a cleaning apparatus of an embodiment of the invention.

Embodiments of the present invention will be described below with reference to the drawings. It is understood that the scale of each of the members in the drawings used in the following description is adequately changed so that they are easily visible.

Organic EL Device

A cleaning method of the present embodiment is a method of cleaning organic substances attached to a vapor-deposition mask when forming light emitting layers of a low molecular weight organic EL device. First, the schematic structure of a low molecular weight organic EL device will be described referring to FIG. 2.

Figure 2:
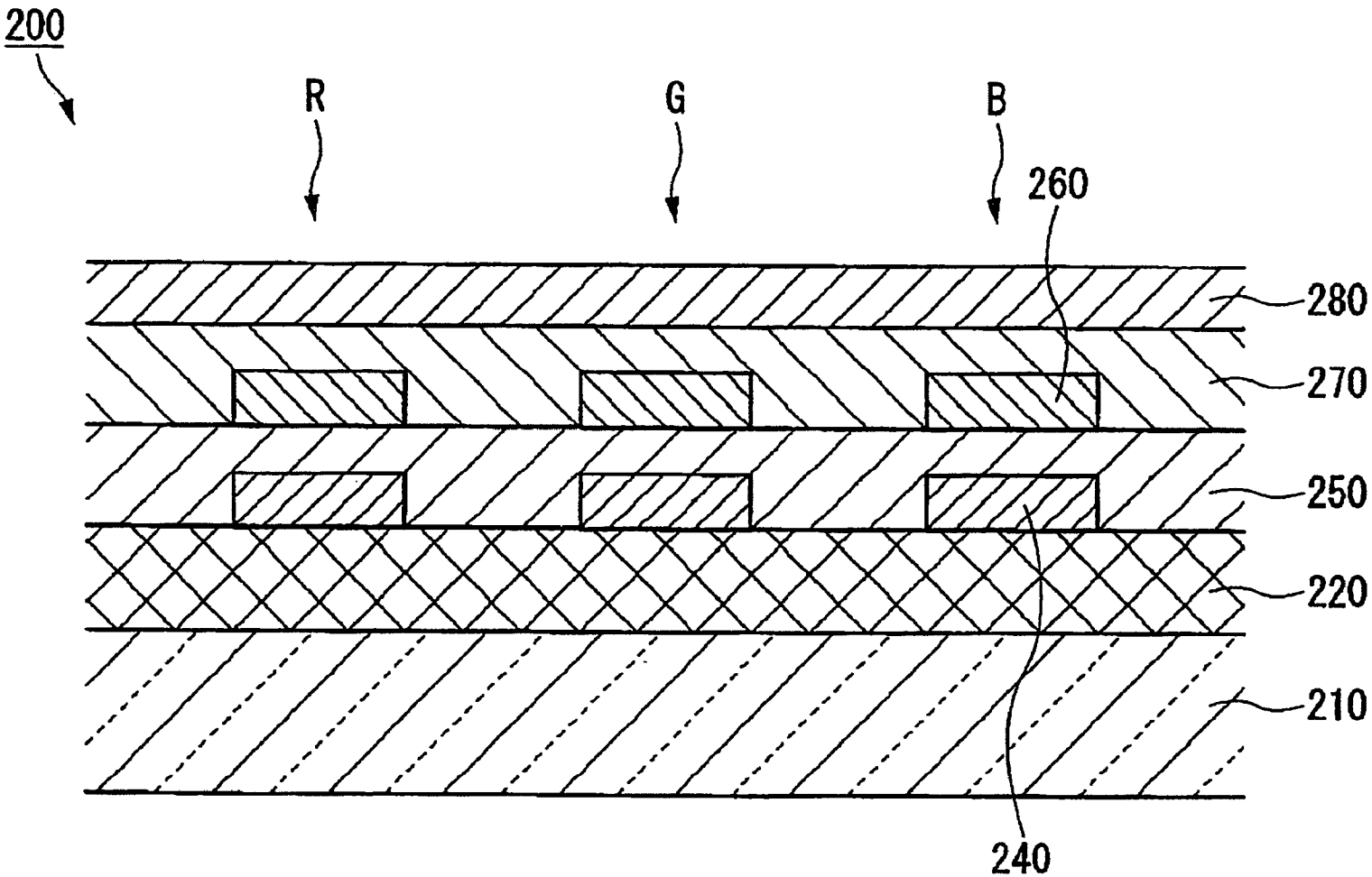
FIG. 2 is a side sectional view of a low molecular weight organic EL device.

FIG. 2 is a side sectional view of a low molecular weight organic EL device. An organic EL device 200 includes a plurality of pixel regions R, G and B arranged in a matrix. A circuit part 220 driving each pixel region is formed on the surface of a substrate 210 composed of a glass material and so forth. In FIG. 2, the illustration of detailed structure of the circuit part 220 is omitted. A plurality of pixel electrodes 240 composed of ITO and so forth is formed on the surface of the circuit part 220, in a matrix corresponding to each of the pixel regions R, G and B. A hole injection layer 250 composed of copper phthalocyanine and so forth is formed so as to cover the pixel electrodes 240 functioning as anodes. In some cases, a hole transport layer composed of N,N-di(1-naphthyl)-N,N-diphenylbenzidine (NPB) may be provided on the surface of the hole injection layer 250.

Light emitting layers 260 corresponding to each of the pixel regions R, G and B are formed in a matrix on the surface of the hole injection layer 250. The light emitting layers 260 are composed of low molecular weight organic materials whose molecular weight is about 1000 or less. Specifically, the light emitting layers 260 are composed of Alq3 (aluminum complex) and so forth as a host material and rubrene and so forth as a dopant. Also, an electron injection layer 270 composed of lithium fluoride and so forth is formed so as to cover each light emitting layer 260. A cathode 280 composed of Al and so forth is formed on the surface of the electron injection layer 270. A sealing substrate (not shown) is attached to an end of the substrate 210 so as to hermetically seal the entire device.

When a voltage is applied between the pixel electrodes 240 and the cathode 280, the hole injection layer 250 injects holes into the light emitting layers 260, and the electron injection layer 270 injects electrons into the light emitting layers 260. Then, the holes and electrons recombine in the light emitting layers 260, and thereby dopants are excited so as to emit light. A low molecular weight organic EL device that thus includes light emitting layers composed of low molecular weight organic materials has a long lifetime and is superior in luminous efficiency.

Vapor-Deposition Apparatus

The above light emitting layers are formed by vapor-deposition treatment using a vapor-deposition apparatus. A vapor-deposition apparatus will be described with using FIG. 3.

Figure 3:
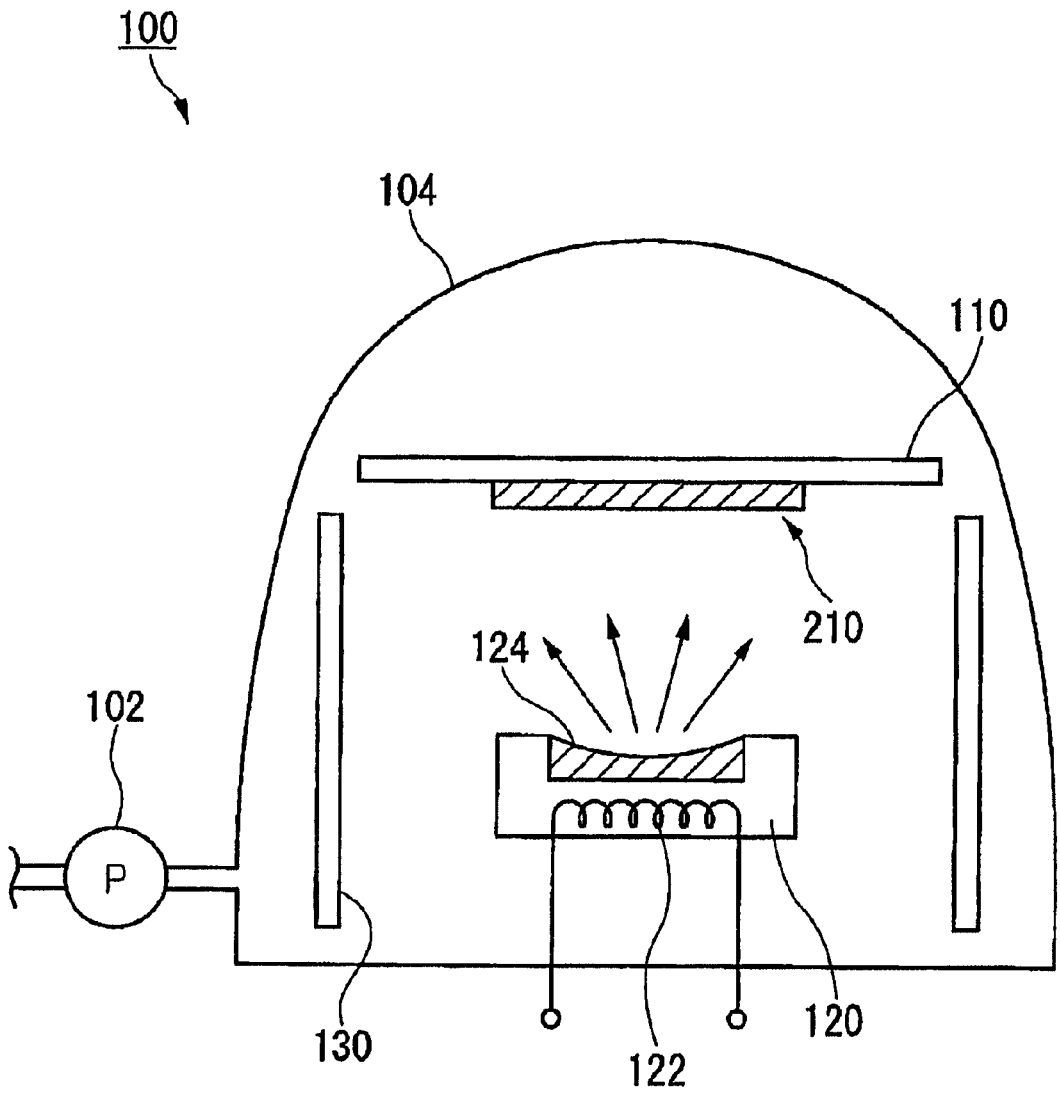
FIG. 3 is an explanatory diagram of a vapor-deposition apparatus.

FIG. 3 is an explanatory diagram of a vapor-deposition apparatus. A resistance-heating vacuum deposition apparatus will be illustrated below by way of example. A vapor-deposition apparatus 100 comprises a chamber 104 connected to a vacuum pump 102. A substrate holder 110 is provided inside the chamber 104. The substrate holder 110 holds the substrate 210 to be treated with vapor-deposition so that the substrate 210 faces downwardly. Meanwhile, a crucible 120 in which a vapor-deposited material 124 is contained is provided so as to face the substrate holder 110. A filament 122 is wired for the crucible 120 so that the vapor-deposited material 124 in the crucible can be heated. Also, a protection plate 130 is provided in order to prevent the evaporated material from attaching to the inside wall and so forth of the chamber 104.

In order to carry out vapor-deposition treatment by using this vapor-deposition apparatus, first the substrate 210 is loaded on the substrate holder 110, and the vapor-deposited material 124 is placed in the crucible 120. Then, the vacuum pump 102 connected to the chamber 104 is operated so as to evacuate the chamber 104. Next, a current is applied to the filament 122 wired for the crucible 120 so as to make the filament 122 generate heat, and thereby heating the vapor-deposited material 124 in the crucible. Then, the vapor-deposited material 124 is evaporated so as to attach to the surface of the substrate 210. The vapor-deposited material that scatters toward directions other than the direction to the substrate attaches to the surface of the protection plate 130.

Figures 4, 5:
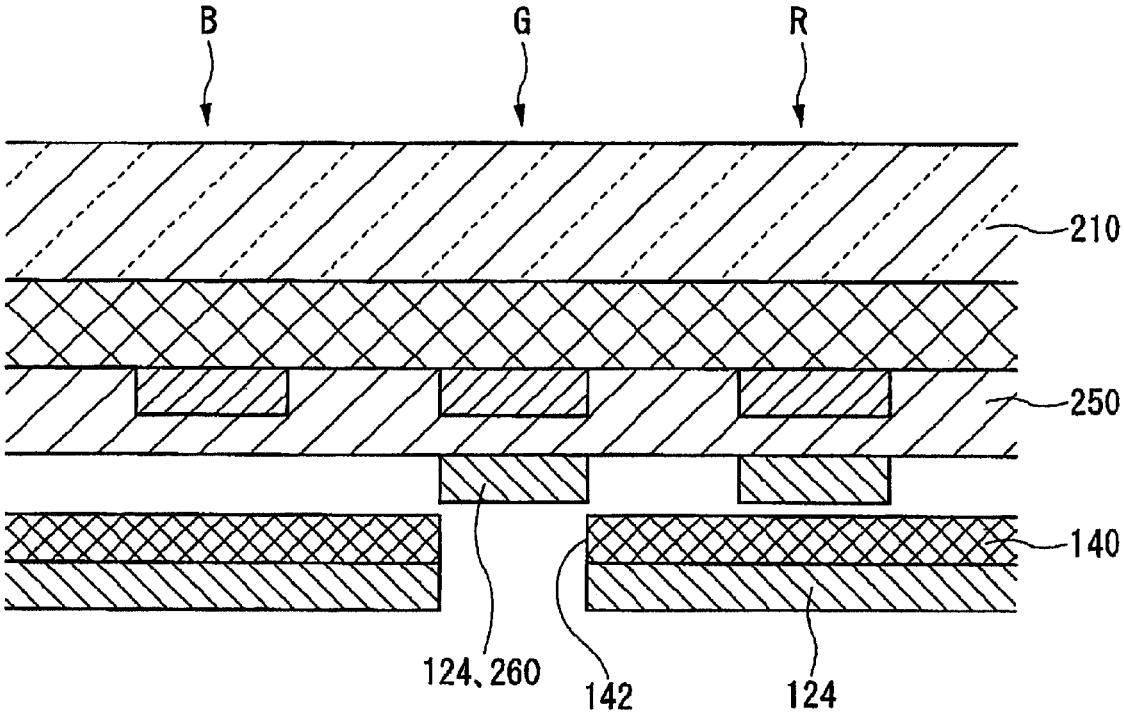
FIG. 4 is an explanatory diagram of vapor-deposition treatment for a substrate.
FIG. 5 shows treatment ways and conditions of each process in a cleaning method of the present embodiment.

FIG. 4 is an explanatory diagram of vapor-deposition treatment for a substrate. In FIG. 4, the substrate 210 faces downwardly. Here, the process of forming the light emitting layer 260 for the pixel region G will be exemplified by way of example. When the light emitting layer 260 is formed, the substrate 210 is loaded on the substrate holder of the vapor-deposition apparatus with the vapor-deposition mask being disposed on the surface of the substrate 210. The vapor-deposition mask 140 is formed of a metal thin plate of stainless steel or the like, and has an aperture 142 corresponding to the formation region of the light emitting layer 260. Meanwhile, a constituent material of the light emitting layer 260 as a vapor-deposited material is placed in the crucible of the vapor-deposition apparatus. Then, when the vapor-deposited material 124 is evaporated, the vapor-deposited material 124 passes through the aperture 142 of the vapor-deposition mask 140 so as to attach to the formation region of the light emitting layer 260 above the surface of the substrate 210. Since the vapor-deposition mask 140 is placed above regions other than the formation region of the light emitting layer 260, the vapor-deposited material 124 attaches to the surface of the vapor-deposition mask. Thus, the light emitting layer 260 can be formed by attaching the vapor-deposited material 124 only to the formation region of the light emitting layer 260.

Moreover, if the aperture 142 of the vapor-deposition mask 140 is moved to above the pixel region B and then vapor-deposition treatment is carried out in the same way as above, a light emitting layer can also be formed in the pixel region B. In this case, the constituent materials of the light emitting layers 260 in each of the pixel regions R, G and: B are sequentially deposited on the surface of the vapor-deposition mask 140. Also, organic substances are deposited on the protection plate similarly. Therefore, the organic substances attached to the vapor-deposition mask 140, the protection plate and so forth need to be cleaned.

Cleaning Apparatus

FIG. 1 is an explanatory diagram showing the schematic structure of a cleaning apparatus of the present embodiment. A cleaning apparatus 1 of the present embodiment comprises a first stage 10 for treating the vapor-deposition mask 140 with a derivative of pyrrolidone, a second stage 20 for rinsing the vapor-deposition mask 140 with water, and a third stage 30 for rinsing the vapor-deposition mask 140 with flowing water. The cleaning apparatus 1 also comprises a fourth stage 40 for treating the vapor-deposition mask 140 with ethanol, a fifth stage 50 for drying the vapor-deposition mask 140, and a carrier (carrying means) 5 that carries the vapor-deposition mask 140 to each stage in sequence. Each stage is provided inside a cleaning chamber 2.

The first stage 10 is a stage for treating the vapor-deposition mask 140 with a derivative of pyrrolidone. Therefore, a treatment bath is provided in the first stage 10 and the inside thereof contains a derivative of pyrrolidone. Derivatives of pyrrolidone are chemicals utilized for resist removal and so forth, and are superior in decomposing organic substances. As derivatives of pyrrolidone, there are 2-pyrrolidone, N-methyl-2-pyrrolidone, N-vinyl-2-pyrrolidone and so forth. Out of them, the use of N-methyl-2-pyrrolidone expressed by Chemical formula 1 exhibits a high cleaning effect at room temperatures.

Chemical formula 1

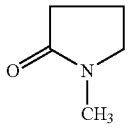

The treatment bath of the first stage 10 may be provided with an ultrasonic cleaner (cleaning means) 16. The ultrasonic cleaning means 16 radiates ultrasonic waves in a cleaning fluid so as to generate standing waves, thereby cleaning objects by means of the action of sound pressure. The ultrasonic cleaning means 16 can preferably radiate ultrasonic waves of 800 kHz or more for example, and more preferably sweep frequency periodically. This allows the distribution of standing waves in the cleaning bath to change so that a high cleaning effect is displayed.

The second and third stages 20 and 30 are stages for treating the vapor-deposition mask 140 with water. Water therefore is contained in treatment baths of the second and third stages 20 and 30. Particularly, a stirring means 36 for water is provided in the treatment bath of the third stage 30. The stirrer (stirring means) 36 allows a water flow to be generated in the treatment bath.

The fourth stage 40 is a stage for treating the vapor-deposition mask 140 with ethanol. Ethanol therefore is contained in the treatment bath of the fourth stage 40.

The fifth stage 50 is a stage for drying the vapor-deposition mask 140. The provision of a blower 50 in the fifth stage 50 permits rapid drying of the vapor-deposition mask. In addition, the use of the blower 56 employing an inactive gas such as nitrogen gas prevents the oxidation and so forth of the vapor-deposition mask 140.

Furthermore, the carrying means 5 that carries the vapor-deposition mask 140 to each stage in sequence is provided. The carrying means 5 is formed into a box shape and the walls thereof are formed of a punched metal, a net material or the like. This allows fluid to freely move from and into the carrying means 5 through the walls. The carrying means 5 is formed into such a size that one or more vapor-deposition masks 140 can be contained therein, and that the-carrying means 5 can be immersed in the treatment bath of each stage. In addition, a driving means (not shown) for transferring the carrying means 5 to each stage in sequence and immersing it in the treatment bath of each stage in sequence is provided.

Cleaning Method

A method of cleaning a vapor-deposition mask by using the above cleaning apparatus will now be described referring to FIGS. 5 and 1. FIG. 5 shows treatment ways and conditions of each process in the cleaning method of the present embodiment. The cleaning method of the present embodiment comprises a first process for treating the vapor-deposition mask 140 with a derivative of pyrrolidone, a second process for rinsing the vapor-deposition mask 140 with water, and a third process for rinsing the vapor-deposition mask 140 with flowing water. The cleaning method also comprises a fourth process for treating the vapor-deposition mask 140 with ethanol and a fifth process for drying the vapor-deposition mask 140.

In the first process, the vapor-deposition mask 140 is treated with a derivative of pyrrolidone. Specifically, the vapor-deposition mask 140 is contained in the carrying means 5 and the carrying means 5 is moved to the first stage 10. Then, the both vapor-deposition mask 140 and the carrying means 5 are immersed in the treatment bath of the first stage 10. The immersing temperature and time are room temperature and three minutes, respectively, for example. This immersion removes organic substances attached to the vapor-deposition mask 140. In the case of providing the ultrasonic cleaning means 16 in the treatment bath of the first stage 10, organic substances can be removed effectively by using the ultrasonic cleaning in combination with the immersion. In the case of a protection plate or the like that has been allowed to stand in the atmosphere for a long period after used in vapor-deposition treatment, organic substances may not be removed even by immersion cleaning for ten minutes. However, using ultrasonic cleaning in combination with immersion permits the complete removal of organic substances attached to such a protection plate or the like.

In the second process, the vapor-deposition mask 140 is rinsed with water. Specifically, the carrying means 5 is moved to the second stage 20, and then both the vapor-deposition mask 140 and the carrying means 5 are immersed in the treatment bath. The immersing temperature and time are room temperature and five minutes, respectively, for example. This immersion removes most of the derivative of pyrrolidone attached to the vapor-deposition mask 140.

In the third process, the vapor-deposition mask 140 is rinsed with flowing water. Specifically, the stirring means 36 provided in the treatment bath of the third stage 30 is driven so as to generate a water flow in the treatment bath previously. Then, the carrying means 5 is moved to the third stage 30, and then both the vapor-deposition mask 140 and the carrying means 5 are immersed in the treatment bath. The immersing temperature and time are room temperature and five minutes, respectively, for example. This immersion completely removes the derivative of pyrrolidone attached to the vapor-deposition mask 140.

In the fourth process, the vapor-deposition mask 140 is treated with ethanol. Specifically, the carrying means 5 is moved to the fourth stage 40, and then both the vapor-deposition mask 140 and the carrying means 5 are immersed in the treatment bath. The immersing temperature and time are room temperature and three minutes, respectively, for example. This immersion allows water attached to the vapor-deposition mask 140 to be replaced by ethanol.

In the fifth process, the vapor-deposition mask 140 is dried. Specifically, the carrying means 5 is moved to the fifth stage 50, and then the vapor-deposition mask 140 is allowed to stand for ten minutes. Since ethanol, which has a low boiling point (evaporating temperature), is disposed on the surface of the vapor-deposition mask 140, the mask can be air dried rapidly. In the case of providing the blower 56 in the fifth stage 50, the blower 56 blows the vapor-deposition mask 140, thereby drying the mask more rapidly.

As described above in detail, in the cleaning method of the present embodiment, organic substances attached to a vapor-deposition mask are cleaned by using a derivative of pyrrolidone. Derivatives of pyrrolidone utilized for resist removal and so forth are superior in decomposing organic substances. Therefore, organic substances can be removed in a short time without requiring physical treatment such as scrub-cleaning and the modification of a manufacturing device. Thus, organic substances attached to a vapor-deposition mask can easily be removed. Accordingly, the bending of a vapor-deposition mask due to the weight of organic substances can be prevented. Therefore, the accuracy of vapor-deposition treatment can be ensured.

Derivatives of pyrrolidone exhibit an excellent cleaning effect even at normal room temperatures. Therefore, organic substances attached to a vapor-deposition mask can be removed without heating. Also, a frame having a thermal expansion rate different from that of the body of a vapor-deposition mask is formed in the peripheral part of the vapor-deposition mask. Heating of the vapor-deposition mask may cause the deformation of body of the vapor-deposition mask because of the difference in thermal expansion rates between the body of the vapor-deposition mask and the frame. In this regard, the cleaning method of the present invention enables the cleaning of a vapor-deposition mask without heating, and thus prevents the deformation of the vapor-deposition mask. It should be noted that heat-cleaning can enhance a cleaning effect if there is no need to take the deformation of a cleaned object into account.

Here, it should be understood that the technical scope of the present invention is not limited to the above embodiments but includes various kinds of modifications of the above embodiments without departing from the scope and spirit of the present invention.

In other words, specific materials and structures described in the embodiments are just examples, and therefore can be modified accordingly. In the embodiments, cleaning of organic substances attached to a vapor-deposition mask for light emitting layers of a low molecular weight organic EL device has been described. The present invention, however, can be widely applied to cleaning of organic substances attached to a manufacturing device of an electro optical device. For example, besides low molecular weight organic EL devices, the present invention can be widely applied to manufacturing devices of high molecular weight organic EL devices, liquid crystal display devices, plasma display devices, field emission display (FED) devices and so forth. Also, besides manufacturing devices used in vapor-deposition treatment, the present invention can be widely applied to manufacturing devices used for film-deposition treatment other than vapor-deposition treatment, etching treatment and so forth.

Working Example 1

With respect to some cleaning fluids, the comparison of cleaning effects against organic substances was made. As the cleaning fluids, ten kinds of solvents and aqueous alkaline solutions were selected. A protection plate used for vapor-deposition treatment was adopted as a cleaned object. The protection plate has been used in a process of forming functional layers of low molecular weight organic EL devices. Organic substances such as copper phthalocyanine, N,N-di(1-naphthyl)-N,N-diphenylbenzidine (NPB), tris(8-hydroxyquinolinolato) aluminum(Alq3), rubrene, and coumarin were attached to the surface of the protection plate. This protection plate was immersed in each cleaning fluid for ten minutes at room temperature. Physical cleaning such as ultrasonic cleaning and scrub-cleaning was not carried out. The protection plate was rinsed with flowing water for five minutes, and dried by nitrogen blowing.

FIG. 6 shows the results of cleaning by each cleaning fluid and the safety of each cleaning fluid. In the case of adopting N-methyl-2-pyrrolidone as a cleaning fluid, the organic substances attached to the protection plate ware all removed, which confirmed that N-methyl-2-pyrrolidone exhibits the most favorable cleaning effect. Here, a resist remover from Shipley Co. was adopted as N-methyl-2-pyrrolidone.

On the contrary, in the case of using a mixture of dimethylsulfoxide and monoethanolamine that is a resist remover from Tokyo Ohka Kogyo Co., the speed of cleaning organic substances was slow, and therefore a lot of organic substances remained after the immersion for ten minutes. Also, monoethanolamine is a chemical relevant to pollutant release and transfer register (PRTR) and has concern for influence on the human body. It therefore is difficult to adopt this mixture as a cleaning fluid.

Ketone and alcohol such as acetone, ethanol and isopropyl alcohol can also clean organic substances. However, since the reattachment of removed organic substances was confirmed, there is a need to change the cleaning fluid frequently. Also, a number of remaining stains on the protection plate were observed. In addition, when these chemicals are used as a cleaning fluid, large-scale safety enhanced facilities are required. It therefore is difficult to adopt these chemicals as a cleaning fluid.

In the case of using alkaline cleaning fluids such as tetra methyl ammonium hydroxide (TMAH) and potassium hydroxide (KOH), a good cleaning effect could not be obtained.

The above results confirmed that N-methyl-2-pyrrolidone, which is a derivative of pyrrolidone, is most favorable as a cleaning fluid against organic substances attached to a protection plate and so forth.

What is claimed is:

1. A cleaning method of removing an organic substance attached to a vapor deposition mask of an electro-optical device, comprising, in order:

exposing the vapor deposition mask to a derivative of pyrrolidone to remove the organic substance;

exposing the vapor deposition mask to water; and exposing the vapor deposition mask to ethanol.

2. The cleaning method according to claim 1 wherein the derivative of pyrrolidone comprises N-methyl-2-pyrrolidone.

3. The cleaning method according to claim 1 wherein the vapor deposition mask is cleaned at room temperature.

4. The cleaning method according to claim 1 wherein the vapor deposition mask is cleaned while applying ultrasonic waves to the derivative of pyrrolidone.

5. The cleaning method of claim 1, wherein the electro-optical device is an organic electro luminescence device.

*6. A cleaning method of removing an organic substance attached to a vapor deposition manufacturing device of an electro-optical device, comprising:*

*exposing the vapor deposition manufacturing device to a derivative of pyrrolidone to remove the organic substance;*

*wherein the organic substance includes a metallo-organic complex, the metallo-organic complex being one of copper phthalocyanine and tris(8-hydroxyquinolinato) aluminum.*

*7. The cleaning method of claim 6, wherein the derivative of pyrrolidone is selected from the group consisting of 2-pyrrolidone, N-methyl-2-pyrrolidone, and N-vinyl-pyrrolidone.*

*8. The cleaning method of claim 6, wherein the vapor deposition manufacturing device is a vapor deposition mask.*

*9. The cleaning method of claim 6, wherein the vapor deposition manufacturing device comprises a protection plate that prevents evaporated material from attaching to the chamber, the evaporated material being the organic substance.*

*10. The cleaning method according to claim 6, further comprising the step of exposing the vapor deposition manufacturing device to water after removing the organic substance.*

*11. The cleaning method according to claim 6, wherein the vapor deposition manufacturing device is cleaned at room temperature.*

*12. The cleaning method according to claim 6, wherein the vapor deposition manufacturing device is cleaned while applying ultrasonic waves.*

*13. The cleaning method according to claim 6, wherein the derivative of pyrrolidone comprises N-methyl-2-pyrrolidone.*

*14. The cleaning method of claim 7, wherein the derivative of pyrrolidone is N-methyl-2-pyrrolidone.*

*15. The cleaning method according to claim 10, further comprising the step of exposing the vapor deposition manufacturing device to ethanol after exposing the manufacturing device to water.*

* * * * *